(12) United States Patent
Shihara et al.

(10) Patent No.: US 6,295,260 B1
(45) Date of Patent: Sep. 25, 2001

(54) OPTICAL DISK APPARATUS AND COMPUTER WITH THE OPTICAL DISK APPARATUS BUILT IN

(75) Inventors: Tetuya Shihara, Osaka; Katsuya Watanabe, Nara, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/298,913

(22) Filed: Apr. 26, 1999

(30) Foreign Application Priority Data

May 13, 1998 (JP) .................................................. 10-129888

(51) Int. Cl.$^7$ ....................................................... G11B 7/00
(52) U.S. Cl. ........................................ 369/53.2; 369/53.22
(58) Field of Search ................... 369/94, 44.27, 369/53.2, 53.22, 53.23, 47.52

(56) References Cited

U.S. PATENT DOCUMENTS 5,745,451 * 4/1998 Mukawa et al. ........................ 369/58
5,831,952 11/1998 Yamada et al. .
6,016,301 * 1/2000 Takasawa et al. ..................... 369/58

* cited by examiner

Primary Examiner—Thang V. Tran
(74) Attorney, Agent, or Firm—Eric J. Robinson; Nixon Peabody LLP (57) ABSTRACT

The optical disk apparatus of the present invention includes: a light source; an optical disk loader for loading an optical disk thereon; a converging optical system, provided between the optical disk loaded on the optical disk loader and the light source, for converging a light beam, which has been emitted from the light source, on the optical disk; and a type recognizing circuit for generating an optical disk recognition signal including information representing whether the optical disk loaded on the optical disk loader is a writable optical disk or a read-only optical disk. The apparatus further includes an irradiation intensity adjusting mechanism for changing, responsive to the optical disk recognition signal, an irradiation intensity of the light beam on the optical disk.

5 Claims, 11 Drawing Sheets

OPTICAL DISK APPARATUS AND COMPUTER WITH THE OPTICAL DISK APPARATUS BUILT IN

BACKGROUND OF THE INVENTION

The present invention relates to an optical disk apparatus for reading out information stored on a disk using a light beam, and also relates to a computer with the optical disk apparatus built in.

In recent years, optical disks of various types have been used widely as information storage media for computers and audiovisual (AV) appliances. These optical disks currently available are roughly classified into the two types: read-only optical disks and writable optical disks.

In this specification, a "read-only optical disk" means an optical disk such as CD-ROM and DVD-ROM with information stored as pits (physically concave or convex portions) on the information recording plane thereof. On the other hand, "writable optical disks" include both write-once optical disks such as CD-R and DVD-R, on which information can be written only once, and optical disks such as CD-RAM and DVD-RAM, on which information can be repeatedly written numerous times. In this specification, optical disks of the former write-once type will be called "recordable optical disks", while optical disks of the latter type will be called "RAM optical disks". A recordable optical disk includes a recording layer made of an organic dye material, which absorbs light at a predetermined wavelength to cause an irreversible structural change. In contrast, a RAM optical disk includes a recording layer made of a material, which causes a reversible phase change responsive to incident light thereon.

The recording density and the prescribed wavelength of light applicable to reading and writing (hereinafter, simply referred to as a "reading/writing wavelength") differ depending on the type of an optical disk. For example, the track pitch of a CD including CD-ROM, CD-R and CD-RAM is 1.6 $\mu$m, while that of a DVD including DVD-ROM, DVD-R and DVD-RAM with a higher recording density and a larger capacity than those of a CD is 0.74 $\mu$m. The reading/writing wavelength of a CD is 780 nm, while that of a DVD is 650 nm. Also, DVD-ROM's are further classified into a single-layered type with only one information recording layer and dual-layered type with two information recording layers. In order to further increase a recording density, optical disks, which are writable and readable with laser light on the blue region of the spectrum, have been developed by utilizing a second harmonic generation (SHG) phenomenon.

Since a wide variety of optical disks are currently used widely, an optical disk apparatus that can read out information from, or is compatible with, any of these various types of optical disks is now in high demand. For example, Japanese Laid-Open Publication No. 9-312057 (corresponding to U.S. Pat. No. 5,831,952) discloses an optical disk apparatus with a function of recognizing the type of a disk loaded as a CD-ROM or DVD-ROM. In this specification, Japanese Laid-Open Publication No. 9-312057 and its corresponding U.S. Pat. No. 5,831,952 are hereby incorporated by reference to illustrate the type recognition of optical disks and the basic structure and operation of the optical disk apparatus of the present invention.

The optical disk apparatus disclosed in the patent identified above can recognize the type of an optical disk loaded and read out information from either a CD-ROM or a DVD-ROM. But the optical disk apparatus, including a laser diode oscillating at a wavelength of 670 nm, cannot read out information from a CD-R. When the apparatus recognizes the type of an optical disk loaded as CD-R, then the loaded optical disk is ejected to prevent the information recorded on the CD-R from being damaged. That is to say, this conventional optical disk apparatus is intended just to read out information from read-only optical disks of various types, not to read or write information from/to writable optical disks.

SUMMARY OF THE INVENTION

An object of the present invention is providing an optical disk apparatus that can read out information from both read-only and writable optical disks and a computer with the optical disk apparatus built in.

DESCRIPTION OF THE PREFERRED EMBODIMENTS

Hereinafter, preferred embodiments of the present invention will be described with reference to the accompanying drawings.

Figure 1:
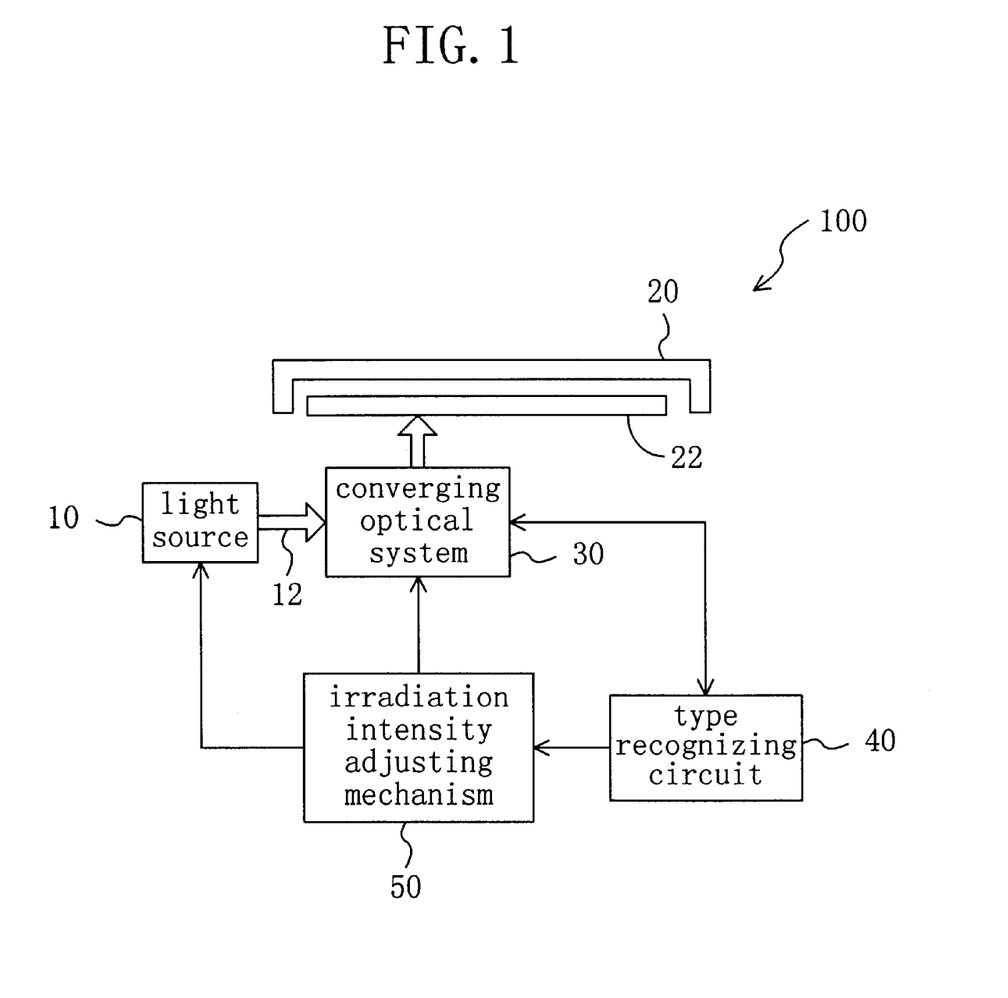
FIG. 1 is a block diagram schematically illustrating an optical disk apparatus according to the present invention.

FIG. 1 schematically illustrates an optical disk apparatus 100 according to the present invention. As shown in FIG. 1, the apparatus 100 includes: a light source 10; an optical disk loader 20; a converging optical system 30; and a type recognizing circuit 40. The optical disk loader 20 loads an optical disk 22 thereon. The converging optical system 30 is provided between the disk 22 loaded on the loader 20 and the light source 10 for converging a light beam 12, emitted from the light source 10, on the disk 22. The type recognizing circuit 40 generates an optical disk recognition signal including information representing whether the disk 22 loaded on the loader 20 is a writable optical disk or a read-only optical disk. The apparatus 100 further includes an irradiation intensity adjusting mechanism 50. Responsive to the optical disk recognition signal, the mechanism 50 changes the irradiation intensity of the light beam 12 on the disk 22. In this specification, the "irradiation intensity of a light beam on an optical disk (optical beam power)" means the intensity of a light beam per unit area on an optical disk.

Alternatively, the mechanism 50 may change the emission intensity of the light beam 12 emitted from the light source 10 responsive to the optical disk recognition signal. The emission intensity may be changed by regulating a drive current (or drive voltage) supplied to the light source 10, for example.

As another alternative, the mechanism 50 may adjust the spot size of the light beam 12 on the optical disk 22 responsive to the optical disk recognition signal. The spot size of the light beam 12 on the disk 22 may be adjusted by changing the position of a converging lens, included in the converging optical system 30, relative to the information recording plane of the disk 22.

As still another alternative, the mechanism 50 may insert or remove an optical element for changing the intensity of the light beam emitted from the light source 10 into/from the optical path from the light source 10 to the disk 22 or changes the transmittance of the optical element. Examples of the optical elements include not only those directly changing the intensity of the light beam, but also those changing the wavelength, phase or polarization direction of the light beam. Optionally, the irradiation intensity may be increased or decreased by combining light beams emitted from a plurality of light sources and making these beams interfere with each other.

Furthermore, the type of the optical disk 22 loaded on the optical disk loader 20 may be recognized based on a signal derived from the disk 22 on the loader 20. Also, if an optical disk inserted in a disk cartridge, e.g., an MD, is loaded, then the type of the disk may be recognized by detecting a hole provided in the cartridge to represent the type of the disk.

If a writable optical disk has been recognized by the optical disk recognition signal, the mechanism 50 sets the irradiation intensity of the light beam 12 on the disk 22 lower than that of the beam 12 on the disk 22 where a read-only disk has been recognized by the signal. By adjusting the irradiation intensity in this manner, it is possible to prevent the information recorded on a writable disk from being damaged.

Generally speaking, information recorded on a writable optical disk currently used (that on a recordable optical disk, in particular) could easily be damaged at a lower irradiation intensity compared to the information recorded on other types of disks. Thus, the irradiation intensity on an optical disk is maintained low enough not to damage even the information recorded on a recordable optical disk until the disk loaded is recognized as a disk of any type other than a recordable optical disk. Also, in view of reliability, the type of an optical disk should preferably be recognized based on a signal derived from the disk loaded.

An optical disk apparatus according to the present invention judges whether an optical disk loaded on the optical disk loader is writable or read-only. Based on the results of recognition (i.e., the type of the optical disk loaded), the apparatus changes the irradiation intensity of a light beam on the disk. Accordingly, the apparatus of the present invention can read out information from both a writable optical disk and a read-only optical disk. The apparatus can also change the irradiation intensity on the disk by adjusting the emission intensity of the beam from the light source or the focal point (spot size) of the converging optical system, inserting or removing an optical element into/from the optical path or changing the transmittance of the optical element. Accordingly, an optical disk apparatus for reading out information from both a read-only optical disk and a writable optical disk can be implemented in a simple arrangement.

Although not illustrated in FIG. 1 for the sake of simplicity, the optical disk apparatus of the present invention includes all the components required for rotating the disk or reading and writing information from/on the disk. These components, which will not be described in this specification, may be well known ones (see, for example, Japanese Laid-Open Publication No. 9-312057 and its corresponding U.S. Pat. No. 5,831,952).

EMBODIMENT 1

An optical disk apparatus 200 according to a first exemplary embodiment of the present invention can read out information from DVD-ROM, DVD-RAM and DVD-R.

Figure 2:
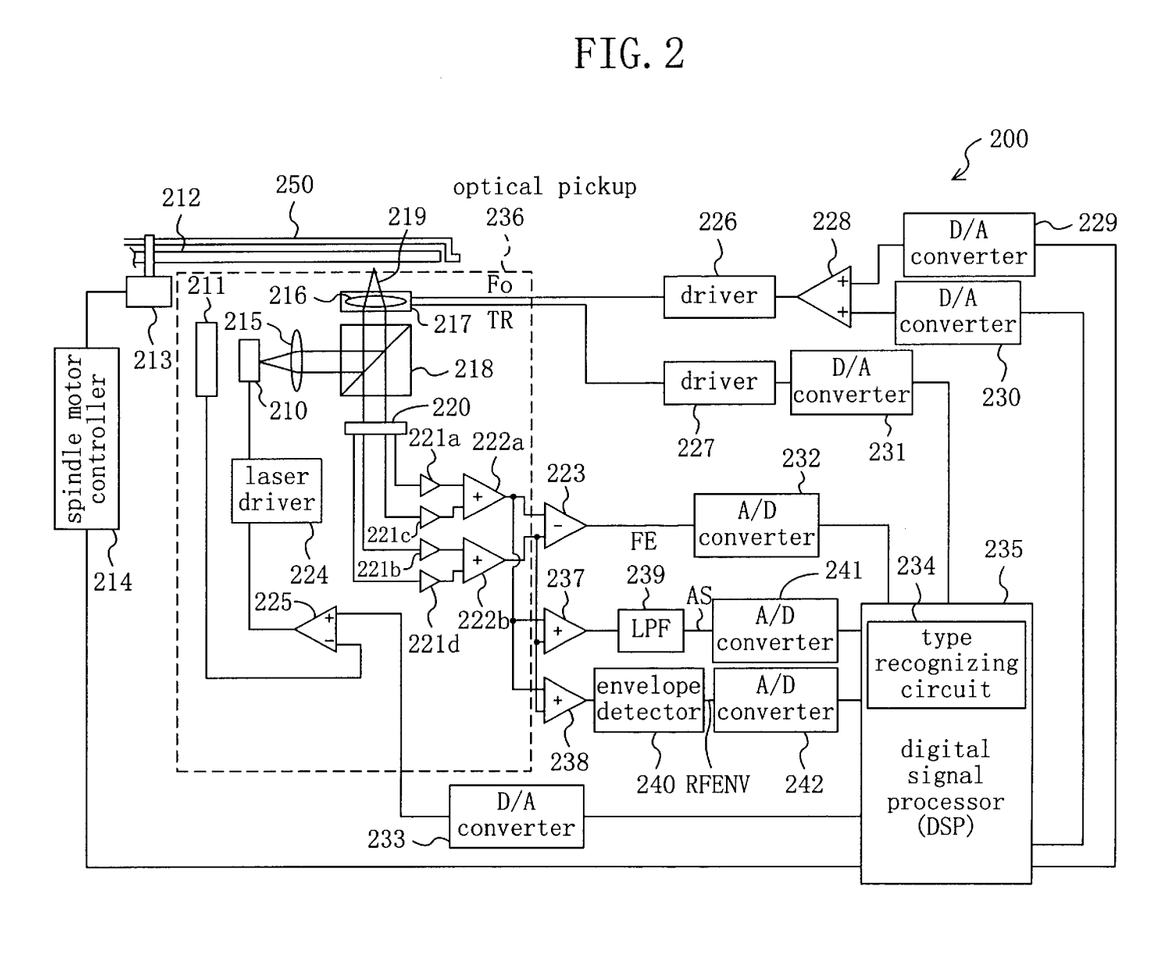
FIG. 2 is a block diagram schematically illustrating an optical disk apparatus according to a first exemplary embodiment of the present invention.

FIG. 2 schematically illustrates the optical disk apparatus 200 of the first embodiment. An optical disk 212 is loaded onto an optical disk loader 250 of the apparatus 200. The apparatus 200 includes: a laser light source 210; and a converging optical system including coupling lens 215, polarization beam splitter 218 and converging lens 216. The laser light source 210 is driven responsive to an output signal of a laser driver 224. Part of a light beam (at a predetermined ratio) emitted from the laser light source 210 is incident on a PIN diode 211. By monitoring the intensity of the light beam incident on the PIN diode 211, the emission intensity of the light beam 219 emitted from the laser light source 210 can be monitored. The output signal of the PIN diode 211 is supplied to the inverting input terminal of a differential amplifier 225 to apply a negative feedback. In this manner, the output signal of the laser driver 224 is controlled to adjust the emission intensity of the light beam 219 emitted from the laser light source 210. The converging lens 216 is moved by an actuator 217 along the optical axis of the light beam 219, thereby controlling the converging state (i.e., the spot size) of the light beam 219 on the optical disk 212.

A digital signal processor (DSP) 235 supplies a predetermined voltage to the non-inverting input terminal of the differential amplifier 225 via a D/A converter 233, thereby setting the emission intensity of the laser light source 210 at a predetermined value. The light beam emitted from the laser light source 210 is transformed by the coupling lens 215 into a collimated beam, which passes through the polarization beam splitter 218 and then is converged by the converging lens 216 to have a predetermined spot size on the optical disk 212. The respective components enclosed with the dashed line in FIG. 2 constitute an optical pickup 236.

The DSP 235 outputs a control signal to a spindle motor controller 214 to have the optical disk 212 rotated by a motor 213 at a predetermined rotation speed.

The optical disk apparatus 200 further includes a photodetector 220 for detecting the light beam reflected by the optical disk 212. The light beam reflected by the optical disk 212 passes through the converging lens 216 and the polarization beam splitter 218 to be incident on the photodetector 220.

Figure 3:
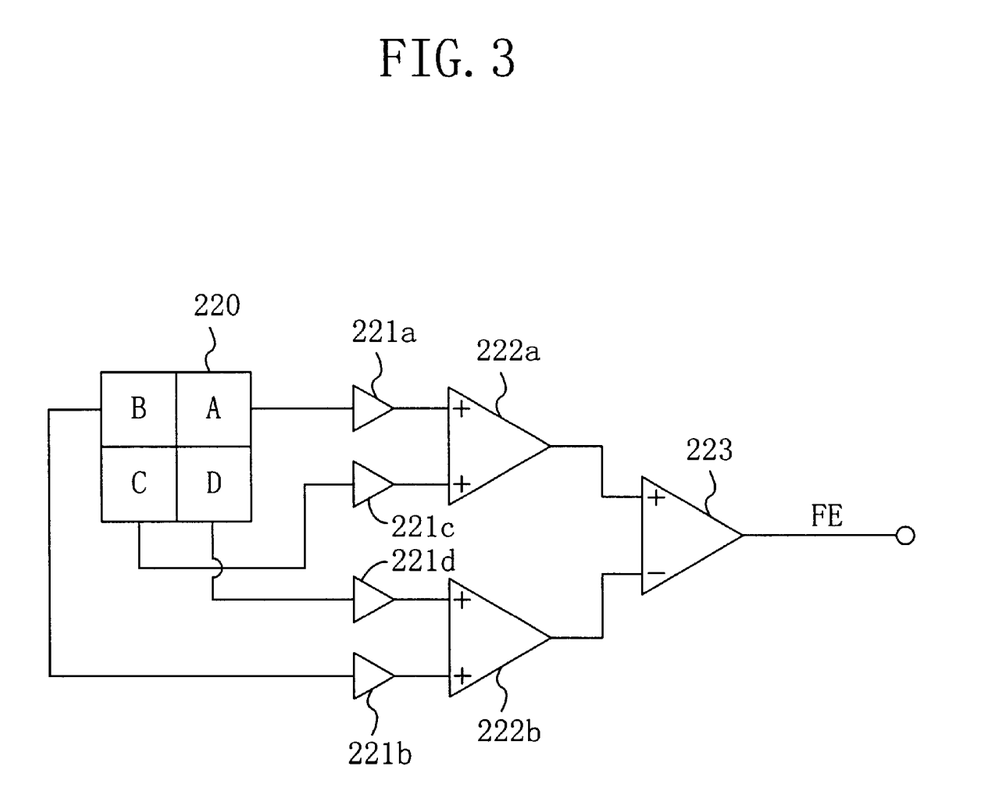
FIG. 3 is a diagram illustrating a quadruple detector used for the optical disk apparatus of the present invention.

The photodetector 220 may be a quadruple detector, for example. As shown in FIG. 3, the quadruple detector includes four detection areas A, B, C and D. Each of these detection areas A through D generates and outputs a signal corresponding to the intensity of the light incident thereon. The output signals of the detection areas A, B, C and D are subjected to current-voltage conversion by associated current-voltage converting amplifiers 221a, 221b, 221c and 221d, respectively. The outputs of the amplifiers 221a and 221c are added together by an adder 222a to produce a diagonal sum signal, while the outputs of the amplifiers 221b and 221d are added together by an adder 222b to produce another diagonal sum signal. These two diagonal sum signals are supplied to a differential amplifier 223, the output of which is obtained as a focus error signal FE.

Also, the sum of the output signals of the detection areas A through D of the quadruple detector 220 is derived by an adder 237. The output signal of the adder 237 passes through a low pass filter (LPF) 239 to generate a total light quantity signal AS. A signal corresponding to the total quantity of light incident on the quadruple detector 220 is generated by another adder 238 for a high band. The envelope of the output signal of the adder 238 is detected by an envelope detector 240, thereby generating an RF envelope detection signal RFENV. This signal RFENV is used as an auxiliary signal for reading out information stored on the optical disk 212 after the signal has been subjected to gain control, waveform equalization and other processing. Such a method for reading out information using an RFENV signal as an auxiliary signal is disclosed, for example, in U.S. Pat. No. 5,831,952 identified above.

The focus error signal FE obtained in this manner is input to the DSP 235. The DSP 235 performs digital computations, including addition, delay and multiplication, on the focus error signal FE, thereby performing low-band gain compensation and phase compensation in the vicinity of a gain intersection to carry out the focus control. The DSP 235 outputs a focus control signal Fo obtained in this way to a driver 226 by way of a D/A converter 229 and an adder 280. The driver 226 performs a current amplification on the focus control signal Fo supplied and then outputs the signal to the actuator 217. Responsive to this signal, the actuator 217 is controlled to move the converging lens 216 to a target position at which the light beam 219 is converged on the optical disk 212 in a predetermined state (to have a predetermined spot size). In this manner, the focus control is carried out in accordance with a known method.

By supplying a predetermined DC offset voltage from the DSP 235 to the driver 226 via the D/A converter 229 and the adder 228, the predetermined converging state (spot size) can be established by the focus control.

The DSP 235 outputs a tracking error signal to a driver 227 via a D/A converter 231. The driver 227 amplifies the tracking error signal and outputs the amplified signal as a tracking control signal Tr to the actuator 217. In response to the tracking control signal Tr, the actuator 217 adjusts the tracking. The tracking control is also performed by a known technique.

When the optical disk 212 is loaded into the optical disk apparatus 200, the DSP 235 calculates the amplitudes or the integrated value of the respective signals FE, AS and/or RFENV based on the output signals from the optical pickup 236. This operation may be performed whether the optical disk 212 stands still or is rotating.

Thereafter, a type recognizing circuit (information storage medium recognizer) 234 operates to recognize the type of the optical disk 212 loaded as DVD-ROM, DVD-R or DVD-RAM. The recognition signal output by the type recognizing circuit 234 includes information representing whether the optical disk 212 loaded is a read-only optical disk or a writable optical disk.

Figure 6A:
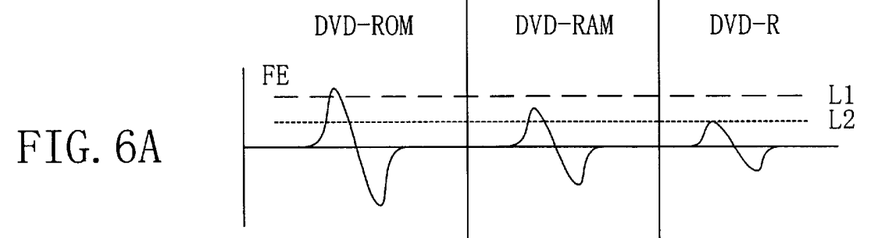
FIG. 6A is a graph illustrating a relationship between the displacement of a converging lens along the optical axis (abscissas) and the amplitude of an FE signal (ordinates)

Responsive to the recognition signal supplied from the type recognizing circuit 234, the DSP 235 outputs predetermined setting parameters, associated with a specific type of the optical disk 212 loaded, to the D/A converters 229, 230, 231 and 233. The predetermined setting parameters are stored beforehand in a memory provided within the DSP 235, for example. The setting parameters include various parameters required for reading (and writing) information from/onto an optical disk of a particular type. Examples of the required parameters include: a predetermined irradiation (or emission) intensity associated with each type of optical disk; various setting parameters such as a focus gain and focus balance parameters for obtaining a predetermined irradiation intensity; a recognition level (e.g., L1 (500 mV) and L2 (200 mV) shown in FIG. 6) for recognizing the type of the optical disk loaded; and so on.

The D/A converters 229, 230, 231 and 233 output predetermined voltages, associated with the setting parameters supplied from the DSP 235, to the corresponding drivers 226, 227 and 224. In response to the respective input signals, the drivers 226, 227 and 224 drive the actuator 217 and the laser light source 210 under prescribed conditions. As a result, the optical disk 212 is irradiated with the light beam 219 at a predetermined irradiation intensity associated with the specific type of the optical disk 212 loaded. During the type recognition operation, the irradiation (or emission) intensity or the converging state of the light beam should be set so as not to damage information on even an optical disk, which is most likely to be damaged by the irradiation of light among the supposed types of disks.

The focus and tracking controls are performed in the same way as a conventional optical disk apparatus at the irradiation intensity defined in this manner, thereby reading out the information stored on the optical disk 212.

(Emission Intensity Control)

Next, a method for controlling the emission intensity of a light beam to obtain an irradiation intensity associated with the specific type of an optical disk 212 loaded will be described.

Figure 4:
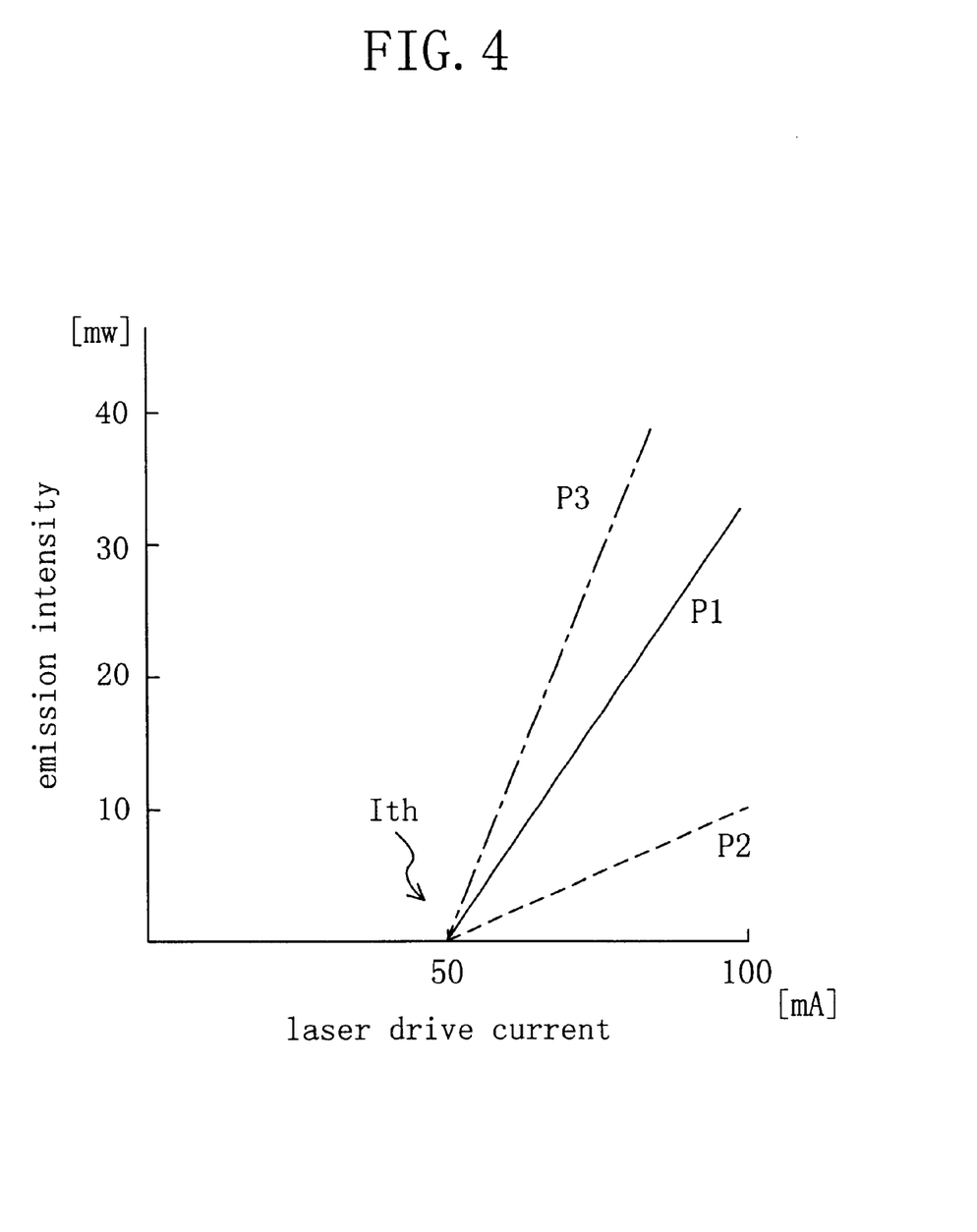
FIG. 4 is a graph illustrating a relationship between a drive current I (mA) supplied to a semiconductor laser diode and the emission intensity P1 (mW).

A drive current I (mA) supplied to a semiconductor laser diode and the emission intensity P1 (mW) have a relationship such as that shown in FIG. 4. When the drive current I exceeds the threshold current Ith (e.g., 50 mA in the example shown in FIG. 4) thereof, the laser light starts to be emitted. If a driver current I larger than the threshold Ith thereof is supplied, the emission intensity P1 increases proportionally to the level of the drive current I. The emission intensity P1 of the laser light source can be controlled based on this relationship.

It should be noted that the irradiation intensity P2 or P3 on the optical disk 212 may be controlled by the optical system (i.e., the converging optical system) provided between the laser light source 210 and the optical disk 212. For example, by changing the converging state (or the spot size) using the converging optical system, the irradiation intensity can be changed as will be described later. Also, in using a plurality of laser light sources, the irradiation intensity on the optical disk 212 may be changed by making the rays, emitted from respective laser light sources, interfere with each other (or combining these rays) through an optical system.

Hereinafter, an exemplary method for controlling the emission intensity of a light beam to obtain an irradiation intensity associated with the specific type of an optical disk loaded will be described with reference to FIG. 5.

First, when the power switch (not shown) of the optical disk apparatus 200 shown in FIG. 2 is turned ON, the apparatus 200 enters an initializing state in Step 1. In this initializing step, the operation parameters (including laser emission intensity and focus control parameters) of the apparatus 200 are set so as not to damage information stored on an optical disk no matter what type of disk has been loaded.

Next, in Step 2, the laser light source 210 is turned ON to emit a light beam 219 based on the initial settings. Then, while the converging lens 216 is moved along the optical axis (in Step 3), the type recognizing circuit 234 measures the amplitudes of respective signals FE, AS and/or RFENV supplied from the optical pickup 236 via the A/D converters 232, 241 and 242 (in Step 4). And the type recognizing circuit 234 compares the maximum values of these signals or results of predetermined computation with respective predetermined setting parameters, thereby recognizing the type of the optical disk 212 loaded and outputting an optical disk recognition signal in Step 5.

Figure 6B:
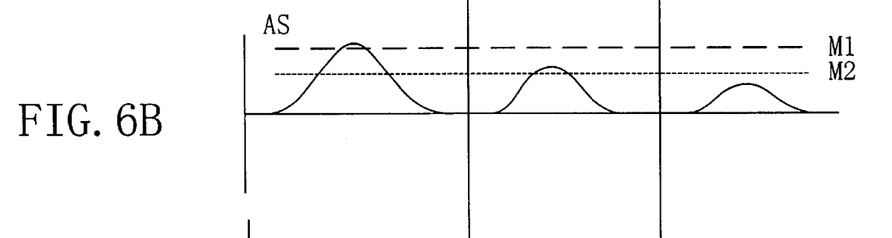
FIG. 6B is a graph illustrating a relationship between the displacement of the converging lens along the optical axis (abscissas) and the amplitude of an AS signal (ordinates)
Figure 6C:
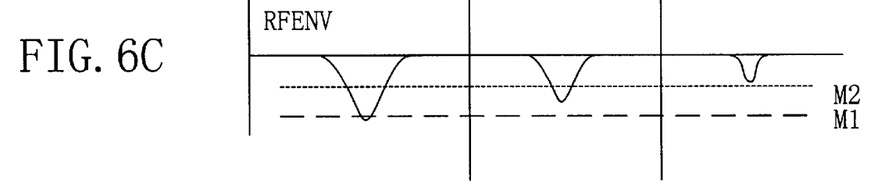
FIG. 6C is a graph illustrating a relationship between the displacement of the converging lens along the optical axis (abscissas) and the amplitude of an RFENV signal (ordinates).

The operation principle of the type recognizing circuit 234 will be described with reference to FIGS. 6A, 6B and 6C. FIGS. 6A, 6B and 6C illustrate respective relationships between the displacement of the converging lens 216 along the optical axis (i.e., in the direction vertical to the information recording plane of the optical disk 212) (abscissas) and respective amplitudes of the signals FE, AS and RFENV (ordinates).

As shown in FIG. 6A, the amplitude of the focus error signal FE differs among DVD-ROM, DVD-RAM and DVD-R. This is because each type of optical disk has its unique reflectance. Accordingly, by measuring the variation in intensity of the FE signal and comparing the maximum value (amplitude) thereof to a predetermined recognition level while moving the converging lens 216 along the optical axis, the type of the optical disk 212 loaded can be recognized (or identified). For example, recognition levels L1 and L2 may be prepared as shown in FIG. 6A. In the example shown in FIG. 6A, if the maximum value of the FE signal is larger than the recognition level L1, then the disk is recognized as a DVD-ROM. If the maximum value is smaller than the level L1 but larger than the level L2, then the disk is recognized as a DVD-RAM. And if the maximum value is smaller than the level L2, then the disk is recognized as a DVD-R. See also Step 5 shown in FIG. 5.

As shown in FIGS. 6B and 6C, by measuring the variation in intensity of the AS or RFENV signal and comparing the maximum value (amplitude) thereof to a predetermined recognition level while moving the converging lens 216 along the optical axis, the type of the optical disk 212 loaded can also be recognized (or identified). For example, recognition levels M1 and M2 may be prepared as shown in FIG. 6B. In the example shown in FIG. 6B, if the maximum value of the AS signal is larger than the recognition level M1, then the disk is recognized as a DVD-ROM. If the maximum value is smaller than the level M1 but larger than the level M2, then the disk is recognized as a DVD-RAM. And if the maximum value is smaller than the level M2, then the disk is recognized as a DVD-R. Similarly, recognition levels N1 and N2 may also be prepared as shown in FIG. 6C. In the example shown in FIG. 6C, if the maximum value of the RFENV signal is larger than the recognition level N1, then the disk is recognized as a DVD-ROM. If the maximum value is smaller than the level N1 but larger than the level N2, then the disk is recognized as a DVD-RAM. And if the maximum value is smaller than the level N2, then the disk is recognized as a DVD-R.

The type of the optical disk may not be recognized with sufficiently high accuracy using any of these signals FE, AS and RFENV separately. In such a case, the recognition accuracy can be improved by performing computations using at least two of these signals FE, AS and RFENV in combination and comparing the results of computations to predetermined recognition levels.

As described above, the type of the optical disk 212 is preferably recognized based on the information derived from the loaded optical disk 212 itself in view of reliability. However, if an optical disk, inserted in a cartridge, is loaded into the optical disk apparatus, then the type of the disk may be recognized based on the information derived from the cartridge. A known recognition technique (e.g., the technique disclosed in Japanese Laid-Open Publication No. 9-312057 and its corresponding U.S. Pat. No. 5,831,952) may be employed.

Figure 5:
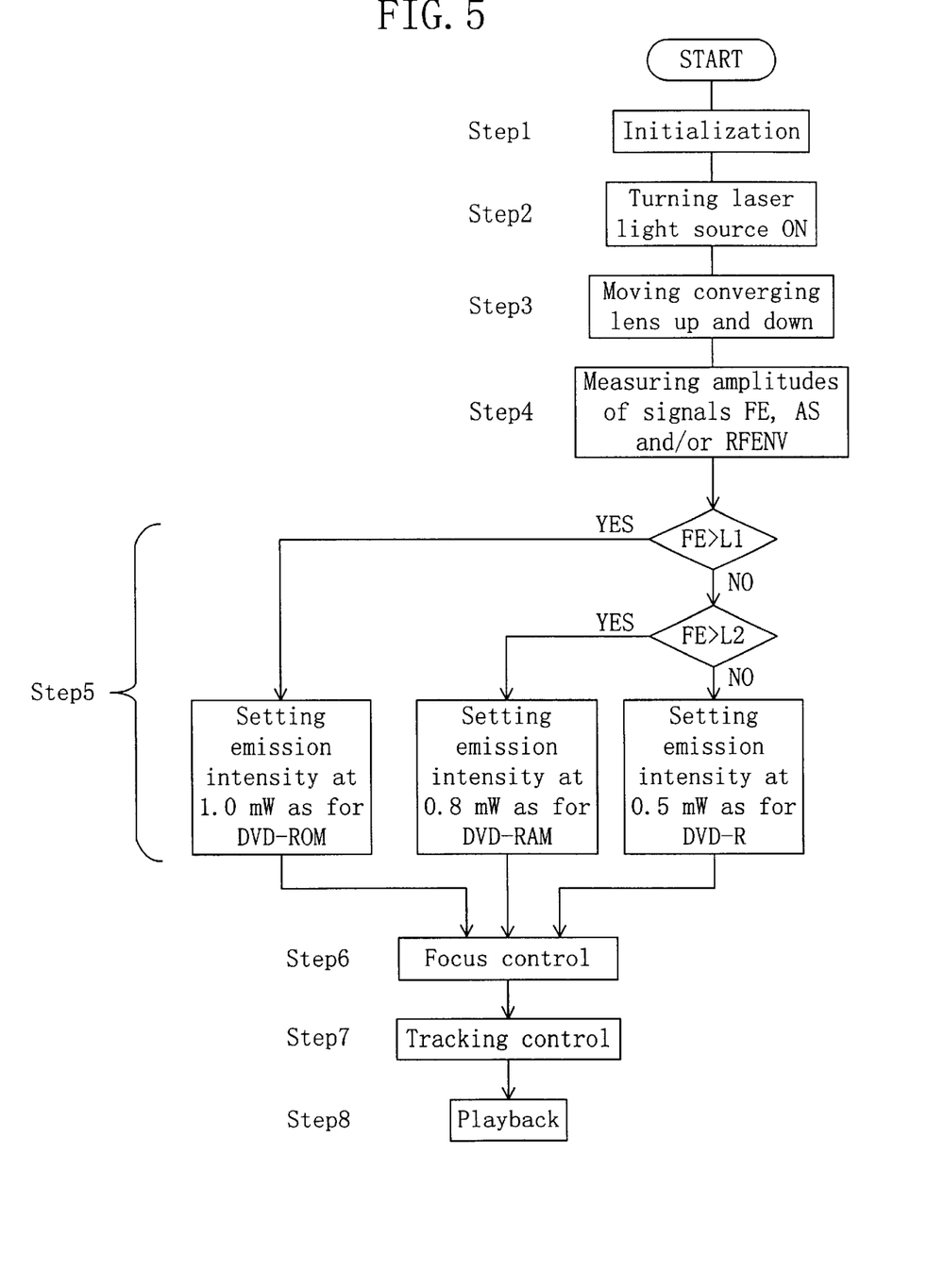
FIG. 5 is a flowchart illustrating a method for controlling the emission intensity to obtain an irradiation intensity associated with the specific type of an optical disk loaded.

In Step 5 of FIG. 5, if the recognition signal output from the type recognizing circuit 234 indicates that the disk 212 loaded is a DVD-ROM, the DSP 235 outputs predetermined setting parameters to the D/A converter 233 to adjust the emission intensity of the light source 210 at 1.0 mW. In response thereto, the D/A converter 233 outputs a voltage corresponding to the setting parameters supplied to the differential amplifier 225. On receiving a signal from the differential amplifier 225, the laser driver 224 supplies a drive current, associated with a DVD-ROM, to the laser light source 210.

If the recognition signal output from the recognizer 234 indicates that the disk 212 loaded is a DVD-R or a DVD-RAM, the DSP 235 outputs predetermined setting parameters to the D/A converter 233 to adjust the emission intensity of the light source 210 at 0.5 mW or 0.8 mW, respectively. After that, the same operations are performed in these cases, too.

Information about the intensity of laser light for reading is recorded on the control track of a DVD-RAM. Accordingly, if the recognition signal output from the recognizer 234 indicates that the disk 212 loaded is a DVD-RAM, then the information about the intensity of the laser light for reading, which is recorded on the DVD-RAM, may be read out instead of using the predetermined value stored on a memory. And the irradiation intensity of the laser light may be set based on the information read out.

After the emission intensity has been set at a predetermined value, associated with the type of the disk loaded, based on the result of recognition of the recognizer 234, focus control, tracking control and information readout are performed as in a known optical disk apparatus in Steps 6, 7 and 8 in FIG. 5, respectively.

(Spot Size Control)

In order to obtain an irradiation intensity associated the type of the optical disk 212 loaded, the converging state of the light beam 219 (i.e., the spot size thereof on the optical disk 212) is controlled.

DVD-ROM, DVD-RAM and DVD-R all have the same diameter of 12 cm, but have respectively different information storage capacities of 4.7 GB, 2.6 GB and 3.95 GB. Also, the size and the shortest length of a pit on the disk (also called a "mark" in a writable optical disk) differ among these types of disks. The shortest pit length of a DVD-ROM is 0.41 $\mu$m, which is shorter than that of a DVD-RAM (0.61 $\mu$m) or that of a DVD-R (0.44 $\mu$m). Accordingly, even if the spot size of a light beam on a DVD-RAM or a DVD-R disk is set larger than that of a light beam on a DVD-ROM disk in reading out information therefrom, satisfactory signal quality (i.e., S/N ratio) is ensured. Also, the larger the spot size is, the lower the irradiation intensity is. Thus, the information stored on the disk is less likely to be damaged by the irradiation of the light thereon. It should be noted that information stored on a DVD-ROM is not damaged by the irradiation of light thereon, because the information is stored on the disk of this type as physical pits.

If the optical disk loaded has been recognized as a DVD-ROM, then the information is read out therefrom by minimizing the spot size of the light beam 219 on the disk (i.e., establishing an on-focus state) to ensure satisfactory signal quality. On the other hand, if the optical disk loaded has been recognized as a DVD-RAM or DVD-R, then the information is read out therefrom at the predetermined spot size thereof, i.e., by increasing the spot size as compared with a DVD-ROM (i.e., establishing an off-focus state). Even in an optical disk with a shorter minimum pit length enabling higher-density recording, the information stored thereon is not damaged by the irradiation of a light beam having a sufficiently large spot size, and satisfactory signal quality is ensured by using a reproduced signal processor such as a high-performance waveform equalizer.

Next, a method for setting a target position during a focus control to obtain a spot size associated with the specific type of the optical disk loaded will be described with reference to FIG. 7. In Steps 1 through 4 of FIG. 7, the same operations as the counterparts shown in FIG. 5 are performed, and the description thereof will be omitted herein.

In Step 5', the type recognizing circuit 234 recognizes the type of the optical disk loaded and outputs an optical disk recognition signal. In response to the recognition signal, the DSP 235 outputs respective predetermined setting parameters to the D/A converters 229 and 230. These setting parameters are determined beforehand to obtain a spot size associated the specific type of the optical disk.

Figure 8:
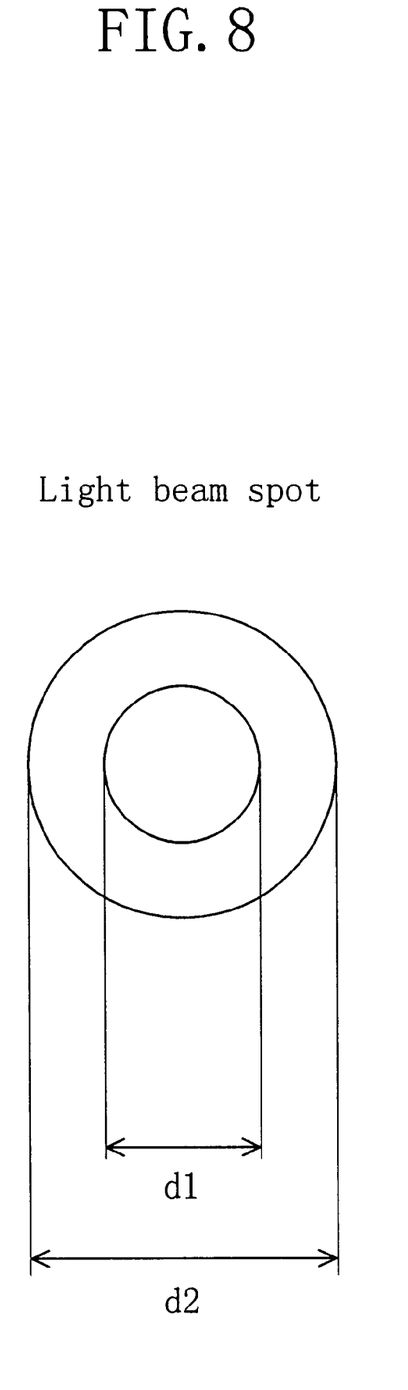
FIG. 8 is a schematic representation illustrating a light beam spot on an optical disk.

FIG. 8 schematically illustrates a light beam spot on an optical disk. If the recognizer 234 outputs an optical disk recognition signal (a) indicating that the disk 212 loaded is a DVD-ROM, the DSP 235 outputs a setting parameter, which has been determined in advance to minimize the spot size on the disk 212 (e.g., to have the diameter d1 in FIG. 8), to the D/A converter 230. On the other hand, if the recognizer 234 outputs a recognition signal (b) indicating that the disk 212 loaded is a DVD-RAM, the DSP 235 outputs another setting parameter, which has been determined in advance to obtain a predetermined spot size on the disk 212 (e.g., to have the diameter d2 in FIG. 8, where d2>d1), to the D/A converter 230. Similarly, if the recognizer 234 outputs a recognition signal (c) indicating that the disk 212 loaded is a DVD-R, the DSP 235 also outputs a setting parameter which has been determined in advance to obtain a predetermined spot size on the disk 212.

On receiving respective setting parameters, the D/A converter 230 outputs an associated control signal and the D/A converter 229 outputs an associated DC offset voltage. The control signal and the DC offset voltage, which are supplied from the D/A converters 230 and 229, respectively, are input to the adder 228 and added together, and the sum is output to the driver 226. In response to the signal supplied, the driver 226 drives the actuator 217, thereby performing focus control in such a manner as to obtain an irradiation intensity associated with the specific type of the disk loaded.

Figure 7:
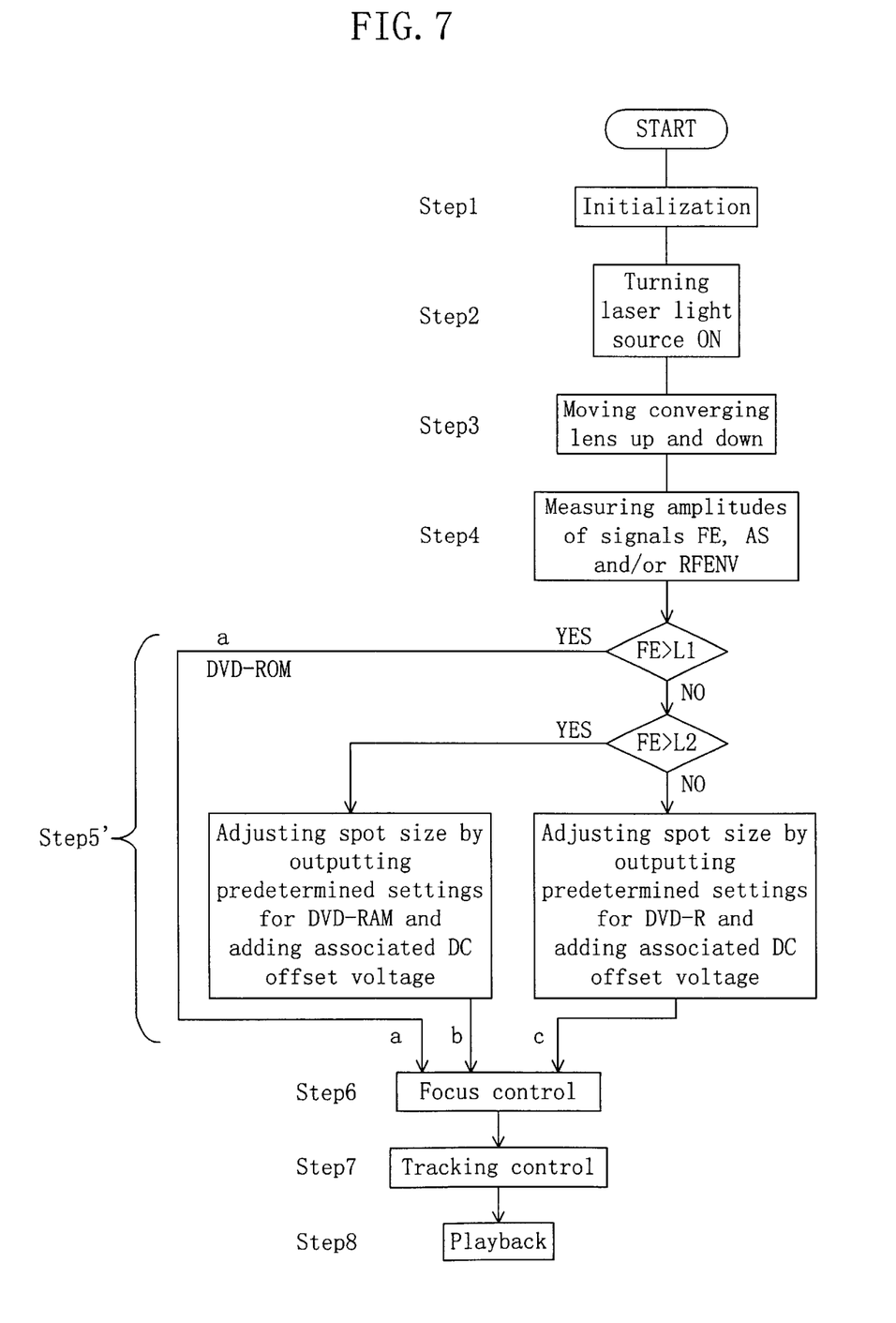
FIG. 7 is a flowchart illustrating a method for setting a target position during a focus control to obtain a spot size associated with the specific type of the optical disk loaded.

Thereafter, focus control, tracking control and information readout are performed as in a known optical disk apparatus in Steps 6, 7 and 8 of FIG. 7, respectively.

The target position, which is defined to read out information from a DVD-ROM as a reference disk during the focus control, may be set in accordance with a known learning control technique or the like such that the jitter, RF or error rate is minimized. The spot size is not necessarily minimized (i.e., in the on-focus state) as in the above-exemplified case.

(Other Examples)

Alternatively, the irradiation intensity on an optical disk may also be controlled by inserting or removing an optical element for changing the intensity of a beam into/from the optical path between the laser light source and the disk or by changing the characteristics of the optical element inserted. Examples of the optical elements include optical filter, slit, aperture, polarizer (polarizing plate or polarizing prism), phase compensation element, wavelength converter and wavelength selector. Any of these elements may be used separately or in combination. For example, a polarizing plate (not shown) may be disposed between the polarization beam splitter 218 and the converging lens 216. By rotating the polarization axis of the polarizing plate within a plane vertical to the optical axis, the intensity of the light beam transmitted through the polarizing plate can be changed.

An optical disk apparatus with a mechanism for adjusting the irradiation intensity of a light beam on an optical disk based on the type of the disk loaded has been exemplified without taking the effect of the rotation speed of the disk into consideration for the sake of simplicity. Strictly speaking, the irradiation intensity of a light beam on an optical disk should be evaluated as optical energy applied to a unit area on the disk. A unique rotation speed (tangential speed) is defined in accordance with the specific type of an optical disk. If an optical disk, loaded into an optical disk apparatus, is rotated at a constant speed, the optical energy (unit: J) applied to a unit area on the disk is proportional to the intensity of a light beam on the disk (unit: W). Stated otherwise, even if the intensity of a light beam is kept constant, the energy applied to a unit area on an optical disk can be adjusted by changing the rotation speed of the disk. The effects of the present invention can be attained by controlling the rotation speed of an optical disk based on this relationship such that predetermined optical energy (irradiation intensity) is obtained depending on the specific type of the disk loaded.

The various techniques for obtaining an irradiation intensity associated with the specific type of a disk loaded may be used separately or in combination. Specifically, emission intensity control, spot size adjustment, insertion or removal of an optical element into/from an optical path, control over the transmittance of the optical element and interference of a plurality of light beams (described later) may be employed separately or in combination.

The optical disk apparatus 200 described above is supposed to read out information from both a read-only optical DVD and a writable DVD. However, the present invention is not limited to such a specific application. For example, if alternate light source (emitting a light beam with a different wavelength), converging optical system and/or detection system are used, an optical disk apparatus that can read out information from both a read-only optical CD and a writable CD is also obtained. These alternate light source, converging optical system and/or detection system for CD playback (readout) may be known ones.

EMBODIMENT 2

An optical disk apparatus according to a second exemplary embodiment of the present invention uses two light beams (i.e., two light sources). The arrangement and functions of the components other than the optical system are substantially the same as those of the first embodiment, and the detailed description thereof will be omitted herein.

Figure 9:
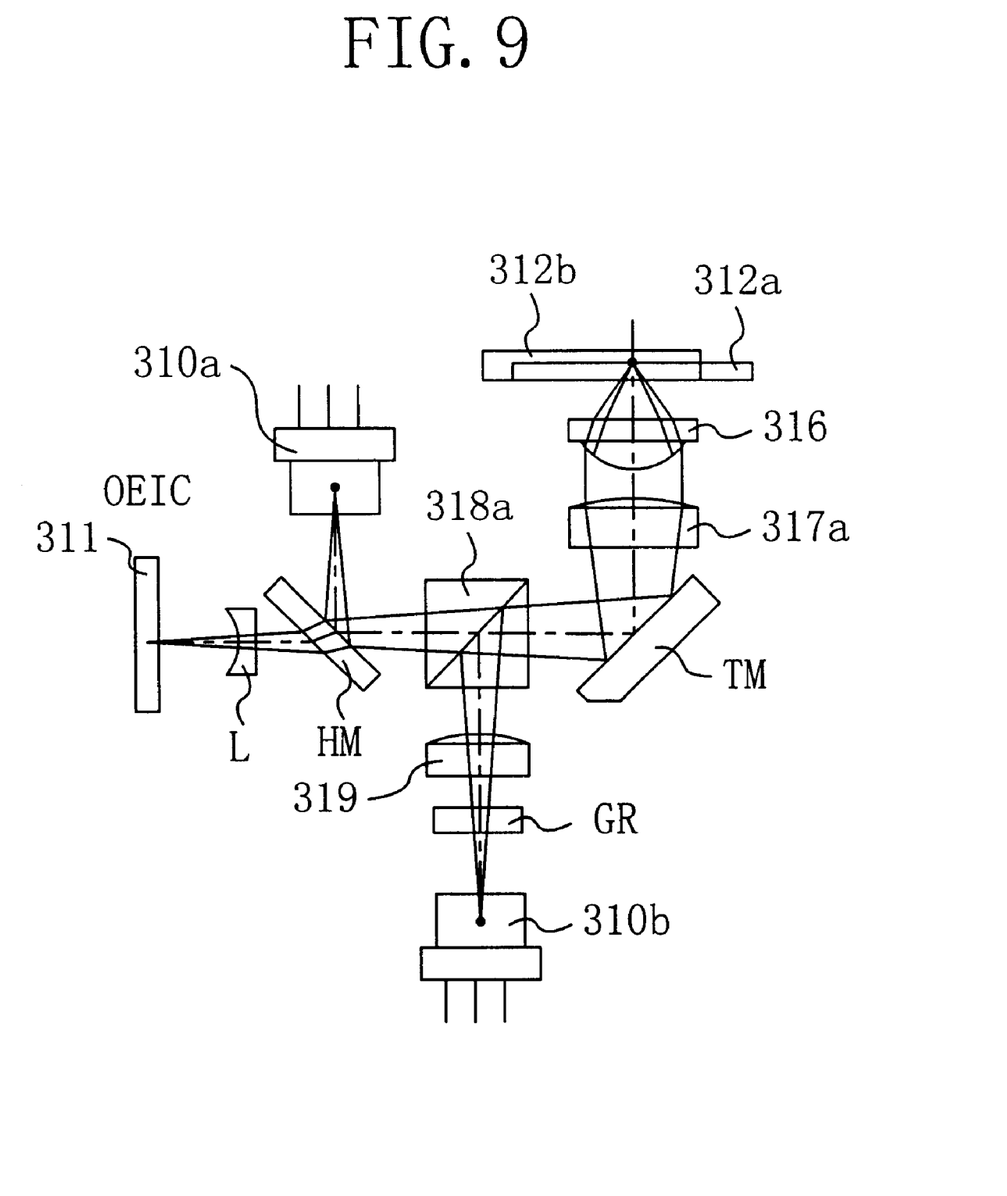
FIG. 9 is a diagram illustrating an exemplary optical system applicable to an optical disk apparatus according to a second exemplary embodiment of the present invention.

FIG. 9 illustrates an exemplary optical system applicable to the optical disk apparatus of the second embodiment. The optical system shown in FIG. 9 includes: a light source 310a for DVD, which emits a light beam at a wavelength of 650 nm; and a light source 310b for CD, which emits a light beam at a wavelength of 780 nm. By applying this optical system to the optical disk apparatus 200, the apparatus 200 can read out information from both read-only and writable disks of the two types, i.e., a DVD 312a (thickness: 0.6 mm) and a CD 312b (thickness: 1.2 mm).

By independently applying the irradiation intensity control technique of the first embodiment to these two light sources 310a and 310b, the optical disk apparatus 200 can read out information from both read-only and writable disks of the two types, i.e., DVD and CD. Substantially the same technique as that of the first embodiment may be employed to recognize the type of an optical disk loaded (including judging whether the disk is a DVD or a CD). Also, the recognition technique disclosed in Japanese Laid-Open Publication No. 9-312057 and its corresponding U.S. Pat. No. 5,831,952 may also be used. Preferably, only one of these light sources should be ON until the type of the disk is recognized. In order to prevent the information stored on an optical disk from being damaged, the light source used for recognizing the type of the disk is preferably a light source for CD, which emits light at a longer wavelength (with lower energy). Also, once the type of the optical disk has been recognized, only the light source for the recognized type may be used.

In the optical system shown in FIG. 9, a light beam, emitted from the DVD laser light source 310a, passes through half mirror HM, polarization beam splitter 318a, total reflecting mirror TM, lens 317a and objective lens 316 to be converged on the optical disk 312a or 312b. A light beam, emitted from the CD laser light source 310b, is split by a grating GR into three beams (i.e., zero-order and ±first-order beams), which pass through relay lens 319, polarization beam splitter 318a, total reflecting mirror TM, lens 317a and objective lens 316 to be converged on the optical disk 312a or 312b. The light beam, reflected by the optical disk 312a or 312b, is led to a photodetector 311 (e.g., an optoelectronic integrated circuit (OEIC)). The exemplary optical systems shown in FIG. 9 may be modified appropriately depending on the intended application of the optical disk apparatus and/or in view of the space reserved for installing the optical system.

Figure 10:
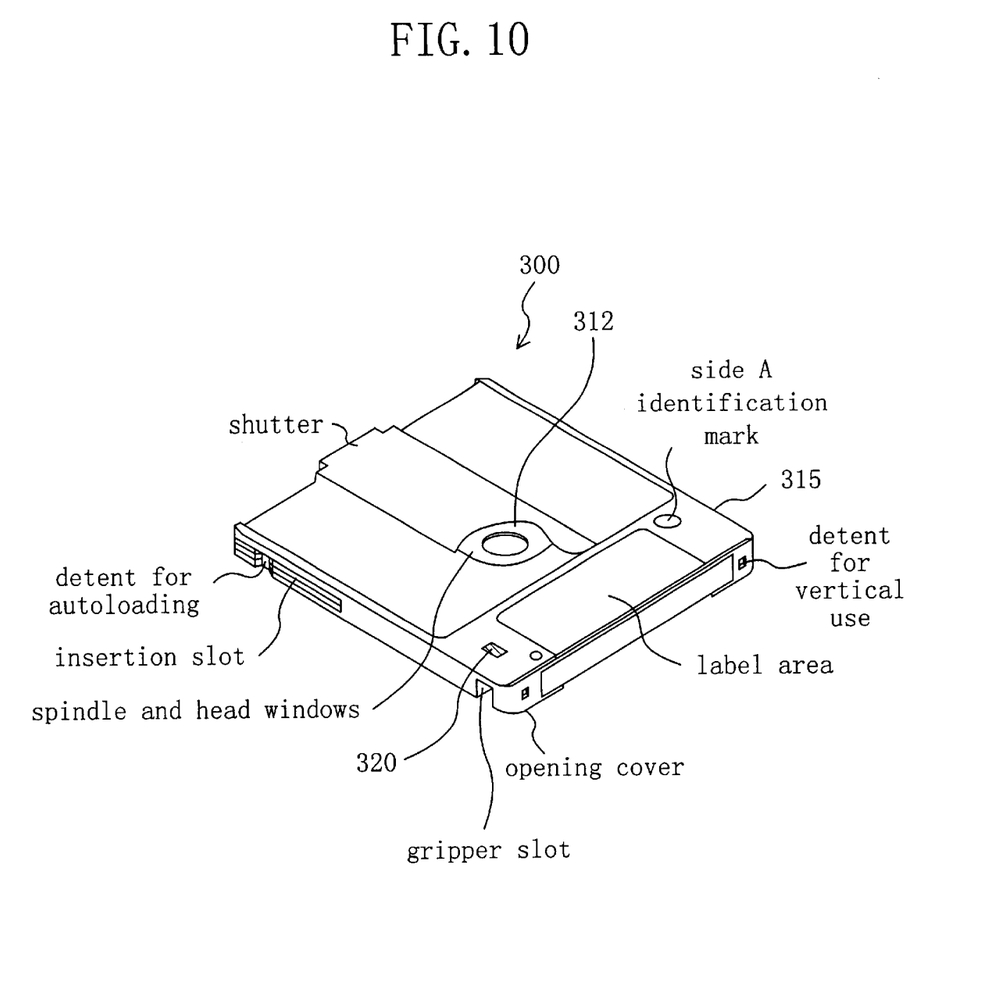
FIG. 10 is a perspective view schematically illustrating a cartridge in which an optical disk is inserted.

In the first and second embodiments, the type of an optical disk loaded is recognized based on the information derived from the disk itself. However, the present invention is not limited to these embodiments. If an optical disk is inserted in a cartridge and is supposed not to be taken out by the user from the cartridge, sufficiently high reliability is attained even if the type of the disk is recognized based on the information derived from the cartridge. A cartridge 300, in which an optical disk 312 is inserted as shown in FIG. 10, includes an optical disk identification mark 320 in the body 315 thereof. The optical disk identification mark 320 may be a hole, a concave portion or a convex portion. In such a case, the optical disk apparatus should include a mechanism for recognizing the type of the optical disk based on the optical disk identification mark.

Figure 11:
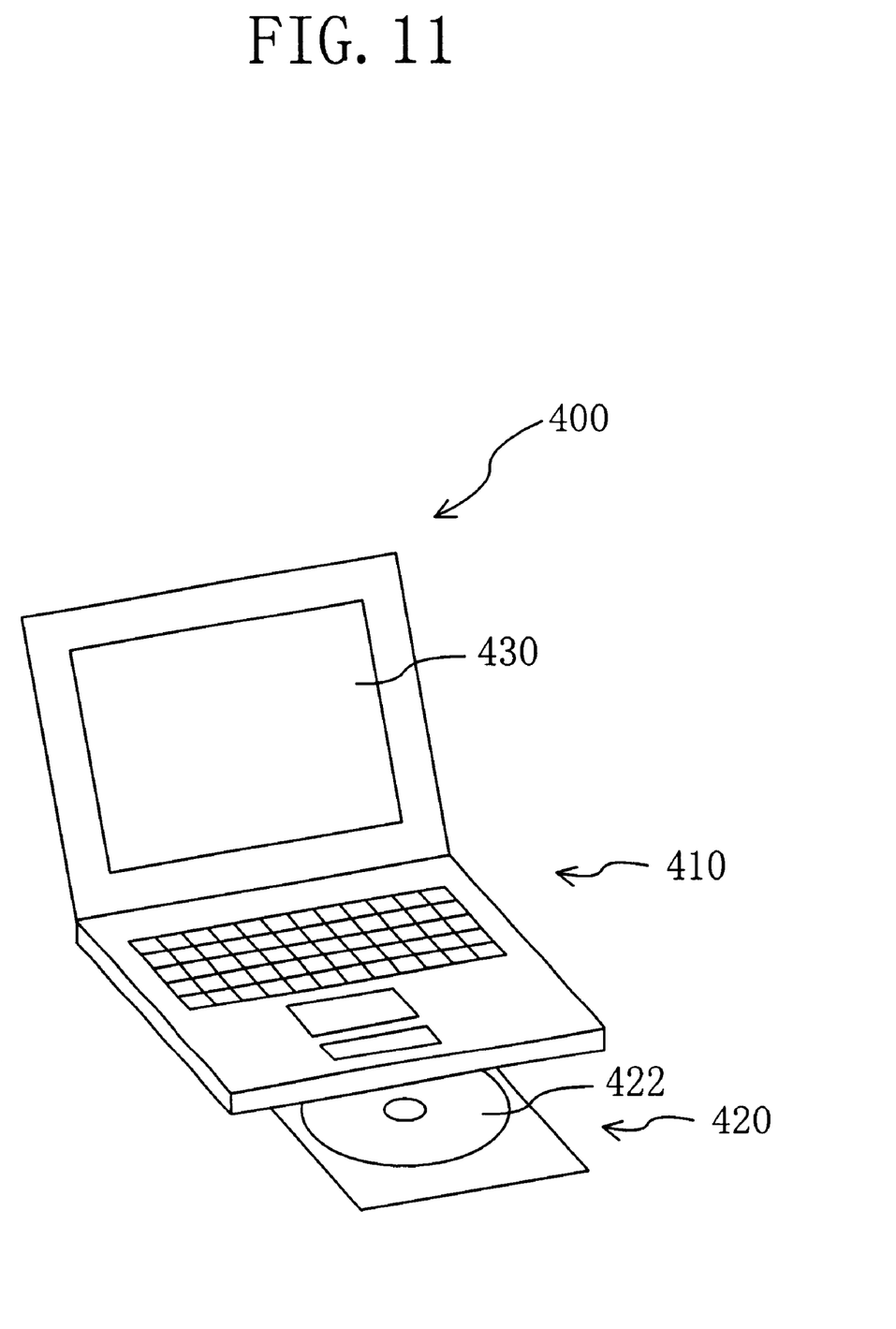
FIG. 11 is a picture of a computer in which the optical disk apparatus of the present invention is incorporated.

The optical disk apparatus of the present invention is suitably applicable to a computer. FIG. 11 illustrates a computer 400 according to the present invention. The computer 400 includes: a body 410 with a built-in processor (not shown) for processing information; an optical disk apparatus 420 according to the present invention; and a display device 430. The processor processes the information read out from an optical disk 422 loaded into the optical disk apparatus 420. The computer 400 incorporates the optical disk apparatus 420 of the present invention and can read out the data from a disk loaded without destroying the data, no matter whether the disk is read-only (e.g., DVD-ROM) or writable (e.g., DVD-RAM). Furthermore, by using the optical disk apparatus of the second embodiment as the optical disk apparatus 420, information can be read out from both CD and DVD.

In the foregoing embodiment, the DVD and CD laser light sources 310a and 310b are both used as a pair of light sources. Alternatively, a pair of light sources for either one type of disk (i.e., DVD or CD) may also be used. In such a case, by making the light beams emitted from these light sources interfere with each other, the irradiation intensity of a light beam on the optical disk can be controlled. An optical system using a pair of light sources with the same wavelength may be easily implemented by modifying the optical system shown in FIG. 9.

The optical disk apparatus of the present invention recognizes the type of an optical disk loaded onto an optical disk loader to determine whether the disk is writable or read-only. Based on the result of recognition, or depending on the type of the disk loaded, the apparatus changes the irradiation intensity of the light beam on the optical disk. Accordingly, the apparatus can read out information from both writable and read-only optical disks. Also, the apparatus can change the irradiation intensity of the beam on the disk by adjusting the emission intensity of light emitted from a light source or the focal point (spot size) of a converging optical system, inserting or removing an optical element into an optical path or changing the transmittance of the element. Accordingly, an optical disk apparatus that can read out information from both read-only and writable optical disks is implementable with a simplified arrangement. Furthermore, if two light sources are provided for CD and DVD playback (read-out), respectively, information can be read out from both CD and DVD.

The optical disk apparatus of the present invention is applicable to computers and AV appliances such as DVD player, CD player, MD player and CD radio cassette recorder.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An optical disk apparatus comprising:
   a light source;
   an optical disk loader for loading an optical disk thereon;
   a converging optical system, provided between the optical disk loaded on the optical disk loader and the light source, for converging a light beam, which has been emitted from the light source, on the optical disk;
   a type recognizing circuit for generating an optical disk recognition signal including information representing whether the optical disk loaded on the optical disk loader is a writable optical disk or a read-only optical disk; and an irradiation intensity adjusting mechanism for changing, responsive to the optical disk recognition signal, an irradiation intensity of the light beam on the optical disk, wherein if the optical disk recognition signal indicates that the disk loaded is a writable optical disk, the irradiation intensity adjusting mechanism lowers the intensity of the light beam on the optical disk as compared to a situation where the recognition signal indicates that the disk loaded is a read-only optical disk.

2. The apparatus of claim 1, wherein responsive to the optical disk recognition signal, the irradiation intensity adjusting mechanism changes an emission intensity of the light beam emitted from the light source.

3. The apparatus of claim 1, wherein responsive to the optical disk recognition signal, the irradiation intensity adjusting mechanism changes a spot size of the light beam on the optical disk.

4. The apparatus of claim 1, wherein responsive to the optical disk recognition signal, the irradiation intensity adjusting mechanism inserts or removes an optical element into/from an optical path between the light source and the optical disk or changes transmittance characteristics of the optical element, the optical element changing an intensity of the light beam that has been emitted from the light source.

5. The apparatus of claim 1, wherein the type recognizing circuit recognizes the type of the optical disk loaded on the optical disk loader in accordance with a signal derived from the optical disk, and outputs the recognition signal based on results of the recognition.

* * * * *